United States Patent
Airoldi et al.

(10) Patent No.: US 9,624,908 B2
(45) Date of Patent: Apr. 18, 2017

(54) AIRFLOW CONTROL ARRANGEMENT

(71) Applicant: SIEMENS AKTIENGESELLSCHAFT, München (DE)

(72) Inventors: Giovanni Airoldi, Vejle (DK); Uffe Eriksen, Horsens (DK); Soeren Gundtoft, Fredericia (DK); Claus Michaelsen, Herning (DK); Thorkil Munk-Hansen, Give (DK); Peter Hessellund Soerensen, Brædstrup (DK); Claus Thygesen, Låsby (DK); Xavier Tourde, Vejle (DK)

(73) Assignee: SIEMENS AKTIENGESELLSCHAFT (DE)

( * ) Notice: Subject to any disclaimer, the term of this patent is extended or adjusted under 35 U.S.C. 154(b) by 455 days.

(21) Appl. No.: 14/253,893

(22) Filed: Apr. 16, 2014

(65) Prior Publication Data
US 2014/0346781 A1 Nov. 27, 2014

(30) Foreign Application Priority Data

May 22, 2013 (EP) .................................... 13168761
Jan. 24, 2014 (EP) .................................... 14152491

(51) Int. Cl.
*H02K 9/04* (2006.01)
*H02K 7/18* (2006.01)
(Continued)

(52) U.S. Cl.
CPC ............... *F03D 9/002* (2013.01); *F03D 1/00* (2013.01); *F03D 9/25* (2016.05); *F03D 80/00* (2016.05);
(Continued)

(58) Field of Classification Search
CPC ..................................... H02K 9/04; F03D 1/00
(Continued)

(56) References Cited

U.S. PATENT DOCUMENTS 3,932,778 A * 1/1976 Watanabe ................ H02K 9/04
310/61
6,742,583 B2 * 6/2004 Tikka ..................... H05K 7/206
165/261
(Continued)

FOREIGN PATENT DOCUMENTS

DE 2182618 A1 * 5/2010 ............... H02K 9/10
EP 1 586 769 A2 12/2009
(Continued)

OTHER PUBLICATIONS

European Search Report dated Nov. 14, 2013; EP Application No. 13 16 8761; Siemens Aktiengesellschaft (7 pages).

*Primary Examiner* — Burton Mullins
(74) *Attorney, Agent, or Firm* — Schmeiser Olsen & Watts LLP

(57) ABSTRACT

An airflow control arrangement for a direct-drive wind-turbine with a generator comprising a rotor and a stator, which airflow control arrangement comprises an outflow fan arranged to draw an exit airflow through an exit duct, which exit duct extends from an interior cavity of the stator to the exterior of the wind turbine. The invention further describes a direct-drive wind turbine comprising such an airflow control arrangement. The invention further describes a method of controlling an airflow in a direct-drive wind-turbine with a generator comprising a rotor and a stator is provided.

14 Claims, 7 Drawing Sheets

(51) Int. Cl.
  *F03D 9/00* (2016.01)
  *F03D 1/00* (2006.01)
  *F03D 80/00* (2016.01)
  *F03D 9/25* (2016.01)

(52) U.S. Cl.
  CPC ............ *H02K 7/18* (2013.01); *H02K 7/1838* (2013.01); *H02K 9/04* (2013.01); *F05B 2260/20* (2013.01); *F05B 2260/64* (2013.01); *Y02E 10/725* (2013.01); *Y02T 50/675* (2013.01)

(58) Field of Classification Search
  USPC ......................................................... 290/55
  See application file for complete search history.

(56) References Cited

U.S. PATENT DOCUMENTS

| | | | | |
|---|---|---|---|---|
| 6,882,068 | B2* | 4/2005 | Weeber | H02K 9/12 310/59 |
| 7,365,447 | B2* | 4/2008 | Yoshida | F03D 13/20 290/44 |
| 8,109,814 | B2* | 2/2012 | Uchino | F03D 80/00 290/44 |
| 8,476,784 | B2* | 7/2013 | Sato | F03D 1/0675 290/55 |
| 2005/0092384 | A1* | 5/2005 | Curb | B31F 7/004 138/140 |
| 2008/0197638 | A1 | 8/2008 | Wobben | |
| 2010/0061853 | A1* | 3/2010 | Bagepalli | H02K 7/1823 416/95 |
| 2010/0102655 | A1 | 4/2010 | Eriksen et al. | |
| 2010/0127502 | A1 | 5/2010 | Uchino et al. | |
| 2010/0140952 | A1* | 6/2010 | Jansen | F03D 9/002 290/55 |
| 2010/0164228 | A1* | 7/2010 | Matsuo | H02K 9/19 290/52 |
| 2010/0176600 | A1 | 7/2010 | Pabst et al. | |
| 2010/0259049 | A1* | 10/2010 | Matsushita | F03D 80/00 290/55 |
| 2011/0012362 | A1* | 1/2011 | Kawai | F03D 1/06 290/55 |
| 2011/0163545 | A1 | 7/2011 | Hirai et al. | |
| 2011/0204652 | A1* | 8/2011 | Sato | F03D 80/00 290/1 B |
| 2011/0221204 | A1* | 9/2011 | Kim | F03D 1/00 290/55 |
| 2011/0241352 | A1* | 10/2011 | Johansen | B03C 3/017 290/1 B |
| 2011/0272949 | A1* | 11/2011 | Matsuo | F03D 80/00 290/55 |
| 2012/0032449 | A1 | 2/2012 | Wobben | |
| 2012/0156053 | A1* | 6/2012 | Stiesdal | F03D 11/00 416/93 R |
| 2012/0205998 | A1 | 8/2012 | Seibicke et al. | |
| 2013/0015665 | A1* | 1/2013 | Wang | F03D 80/00 290/55 |
| 2014/0054897 | A1 | 2/2014 | Casazza et al. | |

FOREIGN PATENT DOCUMENTS

| | | | | |
|---|---|---|---|---|
| EP | 2472108 A1 | * | 4/2012 | ............ F03D 11/00 |
| WO | 2013030444 | * | 3/2013 | ............ H02K 9/18 |

* cited by examiner

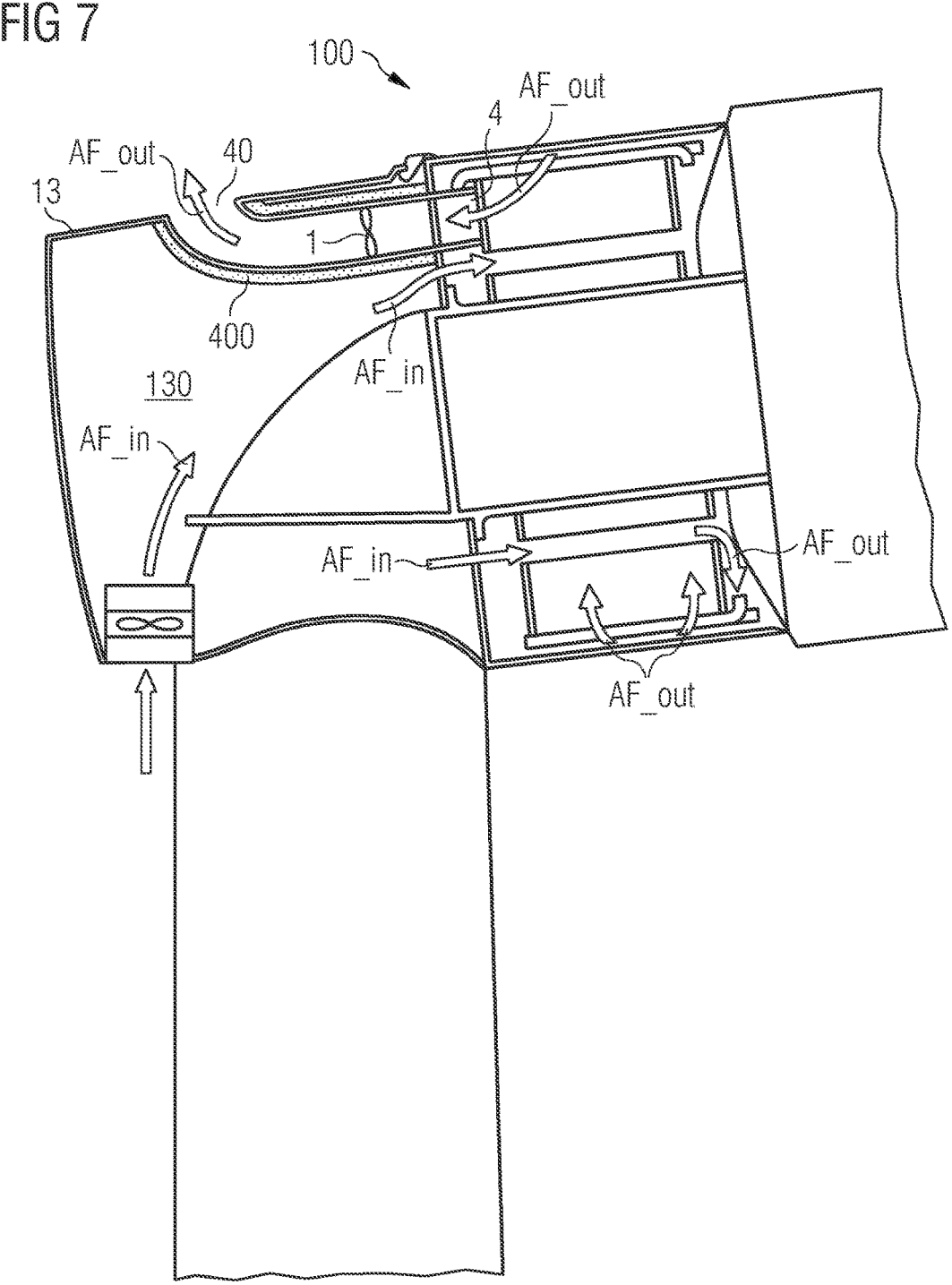

AIRFLOW CONTROL ARRANGEMENT

CROSS-REFERENCE TO RELATED APPLICATIONS

This application claims priority to EP 13168761.8 filed on May 22, 2013 and EP 14152491.8 filed on Jan. 24, 2014, the disclosures of both are herewith incorporated by reference in their entireties.

FIELD OF TECHNOLOGY

The following relates to an airflow control arrangement for a direct-drive wind-turbine; a direct-drive wind turbine; and a method of controlling an airflow in a direct-drive wind-turbine.

BACKGROUND

During operation of an electric generator, the relative rotation of the magnet poles of a field arrangement and the windings of an armature arrangement results in electric currents being induced in the windings. A large generator such as a wind turbine generator can comprise several hundred magnet poles with strong magnetic fields, and the currents induced in the windings are correspondingly large, so that the windings become very hot. The high temperatures can have a detrimental effect on the magnets as well as on other components in the generator such as wiring, control circuitry, sensors, etc. For this reason, a wind turbine generator is usually equipped with a cooling arrangement to cool the hotter parts of the generator. In some designs, heat exchangers are used to transfer the heat to a cooling fluid that circulates through pipes or hoses arranged throughout the generator. However, it is complicated and expensive to arrange such a fluid cooling system so that it efficiently draws the heat away from the windings. Another type of cooling arrangement may comprise a heat exchanger mounted at the rear of the wind turbine nacelle so that it can be cooled by the air passing over the wind turbine. Heat can be transferred from the hot components using cooling fluid in pipes or ducts to the exterior heat exchanger. The extensive arrangement of tubes, hoses, heat exchangers etc. adds to the overall complexity and cost of the wind turbine, and great care must be taken to avoid leakages. Furthermore, maintenance of such cooling systems adds significantly to the costs. In another approach, air may be drawn into the nacelle or canopy using a fan to generate an overpressure in the canopy, so that the air is compelled to pass over the generator in order to reach the exterior again, for example by escaping through a gap between the hub and the canopy. A disadvantage of such systems is that the air will always follow the 'easiest' or widest path to the exterior when it has to make its own way out. Therefore, such known systems are limited in their ability to lower the temperature at the source of the heat, i.e. the windings, since the spaces about the windings are narrow, as is the air-gap between windings and magnet poles. Air that is on its way to the exterior will tend to bypass such bottlenecks. Therefore, such air-cooling systems are generally inefficient. The inability to effectively cool the hot windings means that a wind turbine may not always be operated at full power, since the resulting high temperatures would damage the generator or generator components.

A wind turbine must be designed to operate reliably in different types of environment and under different weather conditions. A high relative humidity of the air in the wind turbine may cause problems, particularly if water vapour should condense on relatively cool components inside the generator. For example, in a direct-drive wind turbine, the outer rotor with its magnetic poles may initially be the coolest part of the generator, and condensation may form on the magnets as the temperature inside the generator increases. To address this problem, in one approach a dehumidifier may be used to extract water vapour from air that is fed into a closed chamber enclosing the stator. To be effective, an air seal between rotor and stator is also required so that the dry air also passes over the magnets. Such a system is considerably more complex and expensive to realise and to maintain, since it is not easy to seal off the rotor and stator together.

SUMMARY

An aspect relates to a more economical and straightforward way of controlling the environment inside a direct-drive wind turbine, avoiding the problems mentioned above.

According to an embodiment of the invention, the airflow control arrangement is realized for use in a direct-drive wind-turbine with a generator comprising a rotor and a stator, which airflow control arrangement comprises an outflow fan arranged to draw an exit airflow through an exit duct, which exit duct extends from an interior cavity of the stator to the exterior of the wind turbine.

An advantage of the airflow control arrangement according to embodiments of the invention is that the airflow is optimally guided over the parts of the generator that need to be cooled most. Instead of just introducing air into the generator and letting it find its own way out, embodiments of the airflow control arrangement specifically compels the airflow to follow a pre-ordained path through spatially separate regions of the wind turbine.

The air is forced to follow this path by the sucking or extracting action of the outflow fan. By defining the path in a turbine-specific manner, forcing the air through the stator interior cavity, an optimal cooling or heating of certain regions of the generator can be achieved. This aspect will be explained in more detail below.

The exit duct comprises a first exit opening through which the exit airflow can be expelled to the exterior of the wind turbine, for example, to the exterior of a canopy of the wind turbine, and a secondary exit opening through which some or all of the exit airflow can be directed back into an interior of the wind turbine, as will be explained below.

According to an exemplary embodiment of the invention, the direct-drive wind turbine, with a generator comprising a rotor and stator, comprises such an airflow control arrangement.

An advantage of the direct-drive wind turbine according to embodiments of the invention is that the air quality within the generator can be optimised at any stage of the wind turbine operation. The air can be used to cool the relevant and critical generator components in a favourably effective manner, and the relative humidity of the air within the wind turbine can also be adjusted as required. This will be explained in more detail below.

According to embodiments of the invention, the method of controlling an airflow in a direct-drive wind-turbine comprises the step of driving an outflow fan to draw an exit airflow through an exit duct, which exit duct extends from an interior cavity of the stator to the exterior of the wind turbine.

An advantage of embodiments of the method according to the invention is that the path followed by the airflow can be defined in a deliberate manner. In other words, the action of the outflow fans in conjunction with the predefined path means that the airflow can be specifically directed over the parts of the generator that are in most need of cooling, heating and/or drying. This allows the quality of the air that passes over these parts of the generator to be adjusted in a favourably straightforward and economical manner.

Exemplary embodiments and features are given by the dependent claims, as revealed in the following description. Features of different claim categories may be combined as appropriate to give further embodiments not described herein.

In a direct-drive wind turbine, the entire generator is more compact than a generator with gearbox. A canopy is used to protect various parts of the wind turbine. For example, the canopy can be shaped to fit over the tower head so that a yaw mechanism is enclosed and protected from rain and dust. The generator is not enclosed under the canopy. The term 'canopy' generally refers to a shell or housing that protects the components enclosed by it from the surroundings. The canopy, a supporting frame such as a bedframe, and a yawing mechanism may be referred to collectively as a 'nacelle' in the following. In the context of the invention, the canopy and nacelle may be regarded as equivalent in terms of function. In an 'outer rotor' design, the rotor is free to rotate about the inner stator. In the following, but without restricting the invention in any way, it may be assumed that the airflow control arrangement is realized in such a wind turbine construction. It may also be assumed in the following that an outer rotor is the field of the generator, and that an inner stator is the armature, so that the magnets are arranged on the inside surface of the rotor, and the windings are arranged on the outer surface of the stator. Of course, it would be possible for an outer rotor to act as the armature and an inner stator to act as the field.

The windings of a large generator generally comprise flat metal bands that slot into the armature. Usually, such a generator has several phases, and the windings of the different phases must cross each other. At one or both ends of the armature, the windings are generally shaped in different ways to fit over and under each other so that the crossings can be effected in a compact and efficient manner. Cavities at the front end and rear end of the generator are dimensioned to accommodate this winding 'overhang'. Here, a "front cavity" is to be understood to be located at the front or hub side of the generator, and a "rear cavity" is to be understood to be located at the rear or canopy side of the generator. Since a generator cavity is spatially separate from the stator interior, to enter the stator interior, air must pass through any gaps between the windings. For example, to pass from the generator front cavity into the stator interior, air must pass through narrow gaps or slits between adjacent windings or winding sections. Therefore, in an exemplary embodiment of the invention, the airflow control arrangement is realized such that the outflow fan draws the exit airflow into the exit duct from a generator cavity through an air-gap between magnet poles of the rotor and windings of the stator. In other words, the sucking action of the outflow fan draws air specifically from a cavity, at the front or rear of the generator, into an air-gap between rotor and stator, and through gaps between adjacent stator windings.

In an exemplary embodiment of the invention, the airflow control arrangement comprises a number of stator ducts, wherein a stator duct extends through the stator from a rear cavity of the generator to a front cavity of the generator and where at least a portion of the exit airflow is drawn by the outflow fan through the stator duct. With this arrangement, the airflow is compelled to follow pre-ordained paths over a number of channels or ducts linking different and spatially separate regions of the wind turbine. For example, an airflow path may be defined by a stator duct, a front cavity of the generator, the stator interior, and finally the exit duct. Another airflow path may be defined by the generator rear cavity, the air-gap, one or more gaps between windings, the stator interior, and finally the exit duct.

As a result, the air is drawn from a cavity of the generator into the stator interior. Aside from the path provided by the stator duct(s), the interior space of the stator is separated in an air-tight manner from the canopy interior. Similarly, the interior space of the stator is separated in an air-tight manner from the generator front cavity, aside from specific airflow paths along which the air is deliberately caused to flow. The term "air-tight" in the context of the canopy and stator may be understood to mean that, apart from the pre-defined airflow path, essentially no other paths are available through which air could "escape" from the wind turbine. The small volume of air that might escape through a labyrinth seal or similar is insignificant and does not detract from the efficiency of the airflow control arrangement according to embodiments of the invention.

The canopy may be mounted to the outer rotor using a labyrinth seal to keep out rainwater and airborne particles. In a simple embodiment of the airflow control arrangement according to the invention, some gaps may be left intentionally at a suitable region of the wind turbine to allow a supply of air to enter the canopy, so that the outflow fan can draw the favourably effective volume of air along the paths defined by the stator ducts, generator front cavity, and exit duct. Alternatively, a number of one-way valves acting as air inlets may be arranged at various points about the canopy to allow air to enter the canopy. However, in an exemplary embodiment of the invention, the airflow control arrangement comprises an inflow fan arranged to draw air into the interior of a canopy of the wind-turbine. In this way, it can be ensured that a favourably effective volume of air is always provided for any required cooling or heating procedure. In such an embodiment, various seals may be used to achieve a relatively air-tight canopy, for example there may be a seal between the canopy and the tower head. This type of arrangement is essentially air-tight but not necessarily entirely airtight, so that essentially all of the air used by the airflow control arrangement is drawn in by the inflow fan, and is contained by the seals, so that only a small fraction can 'escape' from the canopy. The inflow fan is realized create an overpressure in the canopy interior, so that the air is forced to pass into the stator ducts, which are effectively the only exits from the canopy interior.

There are a limited number of 'paths' from the generator front cavity into the stator interior along which the airflow can travel. For example, it may be desired to force the entire airflow to pass over the windings on its way into the stator interior. To achieve this effect, in an exemplary embodiment of the invention, the interior cavity of the stator is defined by rear and front stator plates that effectively seal off the stator interior from the canopy interior on the one side (rear stator plate or 'stator backplate'), and from the generator front cavity on the other side (front stator plate or 'stator frontplate'). In conventional generators using fluid cooling, these stator plates may comprise any number of openings or holes. For use with the airflow control arrangement according to embodiments of the invention, the rear and front stator plates comprise closed surfaces without any openings other than the openings necessary to accommodate the stator duct(s) and exit duct(s). In a further exemplary embodiment of the invention, a stator duct is arranged to pass through a correspondingly shaped opening in a stator plate. Suitable seals such as airtight seals can be arranged about the openings, at the conjunction between stator duct and stator plate, to ensure that the airflow being guided through the stator duct passes from the canopy interior to the front cavity of the generator, i.e. so that essentially no air passes directly from the canopy interior to the stator interior. In this way, as much as possible of the air can be compelled to pass into the generator front cavity, from where it is drawn through the stator windings and through the air-gap between the magnet poles and the windings. This allows the air to be used most effectively, whether for cooling (during operation of the wind turbine), for heating (prior to starting the wind turbine), and/or for drying the air, as will be explained below.

In one mode of operation, the air that has been drawn or sucked by the outflow fan for cooling purposes through the windings and air-gap is removed from the vicinity of the generator, since, by the time the air has passed through the windings and/or air-gap, its temperature will have increased. Therefore, in an exemplary embodiment of the invention, the exit duct is arranged to extend in an essentially airtight manner through a stator plate arranged to separate the stator interior space from the outside. In this way, the airflow that has passed through the windings and through the air-gap is drawn into the exit duct and removed in an efficient manner from the stator interior. During operation of the wind turbine, for example at full power, the hot air can be extracted and expelled to the exterior, so that an efficient cooling of the critical regions of the generator can be achieved.

It is known that in conditions of high relative humidity, the dew point is close to the actual air temperature. This can be a problem in wind turbines being operated in humid conditions. Therefore, in an exemplary embodiment of the invention, the airflow control arrangement comprises an exit outflow arrangement for guiding the exit airflow from the exit duct to the exterior of the canopy and/or back into the canopy interior. Particularly at start-up after the wind turbine has been in standstill, a high relative humidity can mean that water vapour has condensed on the magnets of an outer rotor, since this is the coolest part of the generator. Relative humidity depends on air temperature and the air pressure. In other words, it is possible to alter the relative humidity in a closed system by altering the temperature and/or pressure in the system. An exemplary embodiment of the airflow control arrangement according to the invention puts this relationship to good use, in which the combined action of the outflow fan and exit outflow arrangement ensures that the air circulates along its pre-ordained path in the wind turbine. The exit outflow arrangement is actuated to close off the path to the canopy exterior and to open up the path back into the canopy interior, and at the same time the air is heated by the heat dissipation of the outflow fan. The amount of air inflow can be adjusted so that an overpressure is maintained, to compensate for the amount of air that is expelled from or escapes from the wind turbine. Operation of the airflow control arrangement in this way can be continued until a satisfactory state has been reached, for example, when the dew point has been raised to a level at which water vapour will no longer condense (or at least not to any significant extent) on the magnet poles or on other relatively cool regions of the generator.

The exit outflow arrangement can be realized in any number of ways. It is realized to fulfill a number of functions: to expel essentially the entire exit airflow out of the wind turbine; or to divert essentially the entire exit airflow back into the canopy interior; or to divert a portion of the exit airflow into the canopy interior and the remaining portion out of the wind turbine. In an exemplary embodiment of the invention, the exit outflow arrangement comprises a first means for regulating the exit airflow to the exterior of the canopy and a second means for regulating the exit airflow into the canopy interior. The first and second exit airflow regulating means may be actuated independently of each other, or may be actuated synchronously. For example, the airflow regulating means may comprise a hatch, so that a first hatch regulates the airflow out of the wind turbine, and a second hatch regulates the airflow back into the canopy interior. In such an embodiment, the first hatch can be arranged to essentially completely cover the main exit opening of the exit duct when the first hatch is closed. Similarly, when the second hatch is closed, it essentially completely covers the secondary exit opening of the exit duct. The first and second hatches can be actuated independently of each other, or may be actuated synchronously, so that, for example, when one hatch is completely open, the other is completely closed.

In a further exemplary embodiment of the invention, the hatch arrangement comprises a three-way hatch with a first hatch portion for regulating the exit airflow to the exterior of the canopy and a second hatch portion for regulating the exit airflow into the canopy interior, such that an action of one hatch portion results in a corresponding action of the other hatch portion. The hatch arrangement is controlled so that the hatch portions are controlled synchronously. For example, if the first hatch portion is completely "open", the second hatch portion is completely "closed", so that the entire exit airflow is expelled from the wind turbine; if the first hatch portion is completely "closed", the second hatch portion is completely "open", so that the entire exit airflow is circulated back into the canopy interior; if the first hatch portion is only partially open, the second hatch portion is only partially closed by a corresponding amount, so that one fraction of the exit airflow is circulated back into the canopy interior, and the remaining fraction is expelled from the wind turbine.

Alternatively, an exit airflow regulating means may comprise a fan. In such an embodiment, the first airflow regulating means may be the outflow fan, powerful enough to draw the air through the stator ducts, into the stator interior, and into the exit duct. The second airflow regulating means may also comprise a secondary outflow fan arranged in the secondary duct that branches off the exit duct in the direction of the canopy interior. The volume of air drawn back into the canopy interior can depend on the speed at which this secondary fan is driven. To prevent air from entering the canopy when the entire exit outflow should be expelled from the wind turbine, the secondary fan may simply be turned off, effectively closing off the path into the canopy interior.

The outflow fan is positioned in a suitable region of the exit duct. For example, it may be arranged close to the "mouth" or entrance opening of the exit duct, or closer to the exit opening. The outflow fan is positioned far enough away from the entrance opening to ensure that the air exhibits a linear flow by the time it reaches the outflow fan; and also far enough away from the exit opening so that the noise of the fan, perceived on the outside, can be kept to a minimum. The exit duct is shaped to fit closely about the outflow fan, so that the outflow fan can efficiently draw air into the exit duct.

Alternatively, the outflow fan can be positioned relatively far back in the exit duct, for example, close to an opening in the canopy through which the airflow is expelled from the wind turbine. Such an arrangement may be effective when a secondary fan is positioned in the secondary duct. In this case, the outflow fan and the secondary fan can both be actuated to suck air out of the canopy and ultimately through the windings and air-gap, and the volume of air expelled from the wind turbine or redirected into the canopy interior will depend on the capacity of each fan and the speed at which each fan is driven.

The exit outflow arrangement is controlled according to the quality of the ambient air and/or according to the quality of the air passing through the wind turbine and/or according to the operating state of the wind turbine. For example, when being operated at full power, the hottest parts of the generator (usually the windings) require efficient cooling. Similarly, when the ambient air has a high relative humidity, steps may need to be taken to reduce the humidity. Therefore, in an exemplary embodiment of the invention, the airflow control arrangement comprises a number of temperature sensors for measuring temperature at the canopy exterior and/or in the generator and/or at the generator magnets and/or at the generator windings; and/or a number of humidity sensors for measuring humidity at the canopy exterior and/or in the generator. Information delivered by such sensors can be interpreted and used to adjust the performance of the airflow control arrangement. Therefore, in a further exemplary embodiment of the invention, the airflow control arrangement comprises a control unit realized to control at least the exit outflow arrangement and/or the inflow fan and/or the outflow fan on the basis of measurements provided by one or more sensors. For example, a humidity sensor positioned on the canopy exterior or near the inflow fan can measure the relative humidity of the ambient air. A temperature sensor close to the rotor can provide a temperature reading for that part of the generator. The control unit can analyse the data provided by these sensors to decide whether the airflow should be re-circulated in the interior of the wind turbine for a while, allowing the outflow fan to heat this circulated air, before starting the wind turbine from a standstill state.

In a further exemplary embodiment of the invention, the airflow cooling arrangement is realized to draw air into the exit duct from the front generator cavity through an air-gap between magnet poles and windings of the generator. In this way, an airflow can also be directed over the magnets. Such an airflow can act to cool the magnets also when high temperatures are reached during operation. However, by using the outflow fan to heat the air while circulating the air within the canopy interior and generator, a warmed and dried airflow can be directed over the magnet poles to reduce the likelihood of condensation forming on the magnets, for example when a cool generator is activated after standstill. The airflow can be drawn into the narrow air-gap by using a sufficiently strong motor for the inflow and/or outflow fans. Equally, the generator front cavity can be shaped to encourage the airflow to pass into the air-gap. For example, guides or airflow shaping elements may be arranged over the winding overhang to allow the air to pass over the winding overhang and into the airgap. This may be assisted by minimizing the number of openings to the stator interior in a transition zone between stator plate and winding overhang.

Ambient air can comprise dust, insects, pollen, and other airborne particles. Such impurities in the air could be problematic in the wind turbine interior. Therefore, in a further exemplary embodiment of the invention, the airflow control arrangement comprises a filter arrangement arranged before or after the inflow fan, with one or more filters realized to filter airborne particles from the air. In this way, the inflow fan will draw essentially only filtered air into the canopy interior. In a further embodiment of the invention, the filter arrangement may comprise a salt filter realized for removing airborne salt particles from the incoming air, which may be very fine and difficult or impossible to filter out of the air using conventional mesh filters. A salt filter can function efficiently if its input air is relatively dry. Therefore, in a further exemplary embodiment of the invention, the hatch arrangement and inflow fan are arranged relative to each other so that "dry" air being returned to the canopy interior may be directed towards a salt filter of the inflow fan. In this way, low humidity air from the generator can be mixed with moist air being drawn in from the exterior, so that a satisfactory performance of the salt filter can be ensured. Alternatively or in addition, the filter arrangement may comprise or be combined with a mist eliminator for removing humidity from the incoming air. A mist eliminator may also be referred to as a separator.

A filter arrangement in combination with a mist eliminator that fulfils various functions such as removing mist and/or airborne particles from the incoming air may be referred to collectively as a filtration system. The mist eliminator can be realized in various ways. For example, a mist eliminator can be realized as a separator with an arrangement of angled vanes that deflect the air being drawn in, and thereby cause any moisture to condense and collect on the angled vanes. The condensed water vapour can be collected and expelled through some appropriate outlet. Some separator designs include 'hooks' arranged against the intake direction to trap the airborne moisture droplets. The separator vanes may be made of plastic, aluminium, a carbon fibre reinforced polymeric material, or other suitable material.

In very cold conditions, the collected moisture can freeze over these hooks, thus clogging the inlet passages of the separator. Therefore, in a further exemplary embodiment of the invention, a filtration system comprises a fan arranged to direct an airflow into or onto the separator so that ice build-up can be avoided. Alternatively or in addition, if the separator vanes are made of a conductive material such as carbon or aluminium, an electric current may be applied to the vanes in order to heat them and to melt any ice build-up.

In a further exemplary embodiment of the invention, the filter arrangement comprises a number of inlet filters. For example, a first inlet filter may be used to filter sand, dust, pollen etc. from the incoming air. A second inlet filter may be used to remove salt from the air. Alternatively, a combined inlet filter may be used that is capable of removing several kinds of airborne particles from the incoming air. The inlet filters could be arranged side by side, but are 'stacked', so that the incoming air has to pass through a first inlet filter and subsequently through a second inlet filter before reaching the interior of the canopy.

A filter arrangement or filtration system is housed in a casing that can be mounted to a supporting part of the canopy, e.g. to a bed frame or to some other appropriate region of the canopy. The filtration system is arranged in a lower region of the canopy, for example towards the rear. In an order for the components of the filtration system, a separator is placed at the outside to remove moisture from the incoming air. On the inside, i.e. towards the interior of the canopy, a filter arrangement removes airborne particles from the air. One or more inflow fans are arranged between the separator and filter arrangement to draw air into the canopy interior. The filter arrangement and inflow fan are arranged in close proximity within the casing, so that the incoming air is effectively pushed through the filter arrangement. Of course, a separator, if used, can be spaced apart from the filter arrangement and inflow fan. For example, the separator can be mounted in a canopy opening, while an inflow fan and filter arrangement are arranged elsewhere inside the canopy.

A temperature sensor or other measurement device could be used to monitor the performance of the separator. If a freezing condition is detected, a heating element is activated as long as the freezing condition persists. The temperature sensor can be used to determine when the heating element can be de-activated again. The heating element could be a fan heater arranged to direct a heated airflow over the separator. For example, a fan heater can take the place of an inflow fan inside a filtration system, or a fan heater could be arranged at the same level as an inflow fan, or between the separator and an inflow fan.

Instead of a fan heater, a heating circuit may be used to apply an electric current to the vanes of the separator if these are electrically conductive. At least one fifth of the separator surface area is connected to an electrical circuit for heating in this manner.

The airflow being drawn through the generator can have a beneficial cooling effect or a beneficial heating and drying effect, depending on how the hatch arrangement and inflow/outflow fans are being driven. A single stator duct may be sufficient to draw in enough air to cool or heat the relevant generator regions, particularly when the wind turbine is in operation, since the rotation of the rotor will also act to promote the circulation of the air in the vicinity of the magnets and windings and in the air-gap. In an exemplary embodiment of the invention, however, the airflow control arrangement comprises a plurality of stator ducts extending from the canopy interior to the front cavity of the generator. The stator ducts are arranged in a parallel fashion, i.e. lying essentially parallel to each other and/or parallel to the longitudinal axis of the stator. However, a stator duct may be arranged at an angle to the longitudinal axis of the stator. The stator ducts may be distributed about the stator in any suitable manner. The stator ducts are evenly spaced about the stator. For example, a pair of stator ducts may be diametrically opposed on two sides of the stator. One such arrangement may comprise a first stator duct on the left-hand side of the stator, and another on the right-hand side. In another embodiment, there may be three stator ducts arranged more or less equidistantly about the stator. Alternatively, the exit duct and three stator ducts may be arranged such that each lies in a quadrant of the stator. Of course, any number of stator ducts may be used, and the number may depend on the volume of air that should be able to pass through, as well as on the available space in the stator cavity.

The airflow control method according to embodiments of the invention can be used to 'prepare' or 'condition' the air inside the wind turbine before starting or stopping the generator, or to respond to a change in temperature or humidity during operation of the wind turbine. To this end, the method according to embodiments of the invention comprises the step of obtaining temperature measurements from the canopy exterior and/or the generator and/or the generator magnets and/or the generator windings. For example, an increase in temperature of the windings may indicate that the fan power should be increased to increase the rate of air flow over the windings, and the hatch should be controlled to expel the air to the exterior. One or more low temperature readings might indicate that the air should be heated (for example using the heat dissipated by the outflow fan) and re-circulated for a suitable length of time before starting the wind turbine, or until the temperature readings are satisfactory. Such temperature measurements may, if necessary, be augmented by humidity readings. To this end, the method according to embodiments of the invention comprises the step of obtaining humidity measurements from the canopy exterior and/or a location on the interior of the wind turbine, for example the generator. An unfavourably high humidity can be 'corrected' by increasing the temperature of the air inside the wind turbine. This can be achieved by re-circulating the air and heating it using the heat dissipated by the outflow fan, as described above. The temperature increase results in a decrease in relative humidity.

Measurements carried out in the course of developing the airflow control arrangement according to the invention have shown that a non-insulated exit duct can contribute significantly to the heating of the canopy interior. For practical reasons, the exit duct is preferably made of a robust, long-lived, lightweight and economical material such as steel. The exit duct can have a length of several meters, and its diameter might typically be about 400 mm to 1000 mm. Depending on the exit duct dimensions and the flow rate of the exit airflow, the rate of heat energy transfer from the wall of the exit duct into the nacelle interior can reach a value of several kilowatts. Therefore, in a further embodiment of the invention, the exit duct is at least partially enclosed by a thermally insulating material. A material with a favourably low thermal conductivity is used. For example, one or more layers of insulation cladding can be wrapped around the exit duct. If the exit duct comprises an airflow regulating means for guiding some portion of the exit outflow back into the canopy interior (for example during a start-up procedure), the insulating material can be arranged about a secondary exit opening of the exit duct.

BRIEF DESCRIPTION

Some of the embodiments will be described in detail, with reference to the following figures, wherein like designations denote like members, wherein:

FIG. 7 shows a fourth embodiment of an airflow control arrangement.

DETAILED DESCRIPTION

In the diagrams, like numbers refer to like objects throughout. Objects in the diagrams are not necessarily drawn to scale. In particular, the air-gap between rotor and stator, or the gaps between stator windings, are shown in an exaggerated manner. For the sake of clarity, the diagrams only indicate the relevant components of a wind turbine, and these are shown in a very simplified manner.

Figure 1:
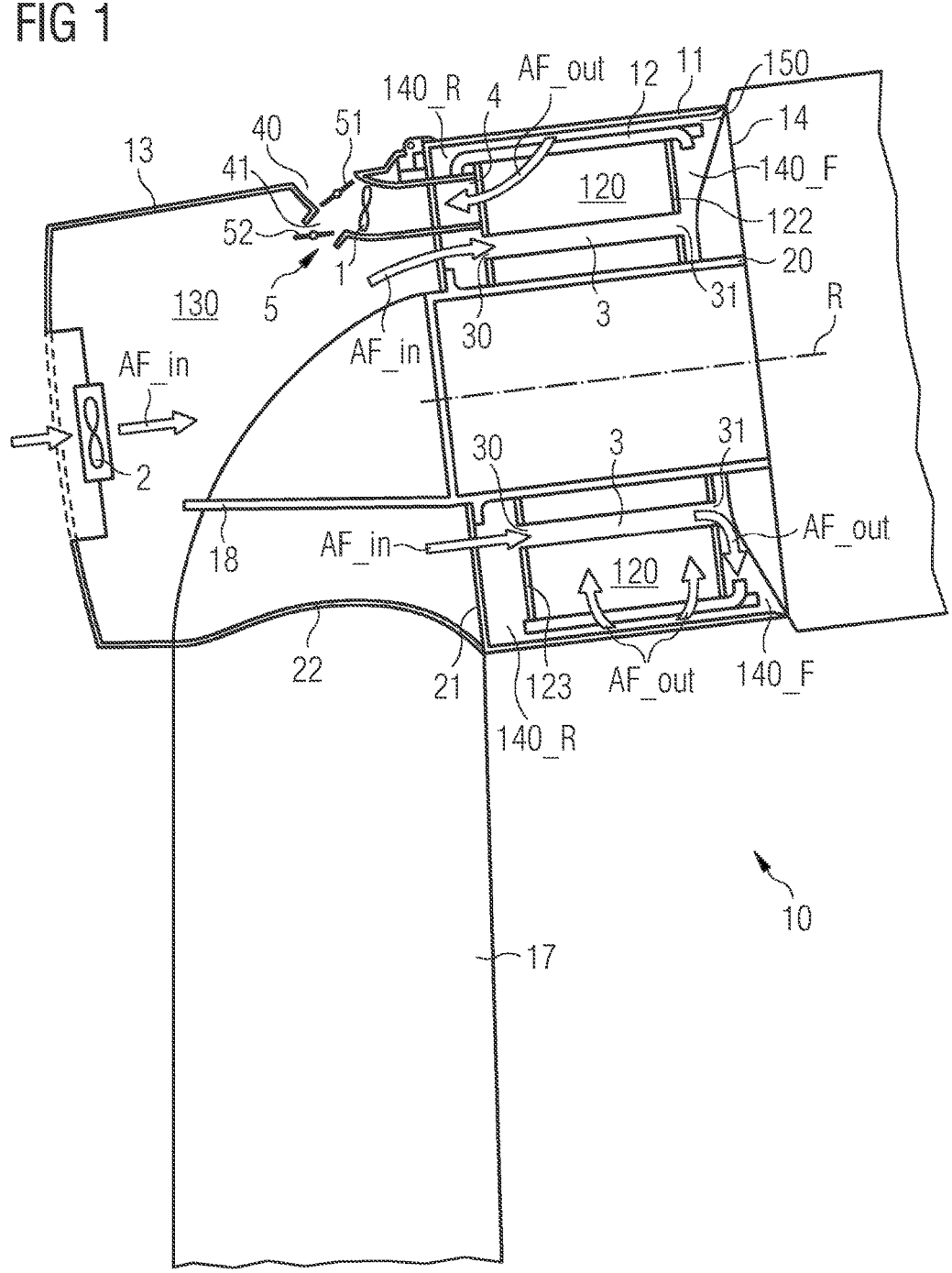
FIG. 1 shows a first embodiment of an airflow control arrangement.

FIG. 1 shows a first embodiment of an airflow control arrangement according to the invention. The diagram shows the interior of a direct-drive wind turbine 10, in which a generator 14 is mounted on a shaft 20. The generator comprises an outer rotor 11 and an inner stator 12. A hub and rotor blades (not shown in the diagram) are mounted to the front of the shaft 20, so that a rotation of the hub results in a rotation of the outer rotor 11 about an axis of rotation R. The inner stator 12 remains stationary relative to the shaft 20. Windings 121 (cf. FIGS. 3 and 4) are arranged on the outer surface of the stator 12, while magnet poles 111 (cf. FIGS. 3 and 4) are arranged on the inner surface of the rotor 11. A narrow air-gap 150 separates the poles 111 from the windings 121. For design reasons, the windings 121 have a certain amount of overhang at one or both ends of the stator 12. This overhang is accommodated in a generator front cavity 140_F. Installation of such a wind turbine 10 can be carried out by lifting the entire generator 14 and mounting it in place in front of a canopy 13 mounted onto a tower 17.

In this embodiment, the canopy 13, tower 17 and generator 14 are connected in an essentially air-tight manner by means of seals 21, 22 between canopy 13 and tower 17 and between canopy 13 and generator 14. The seal 21 between canopy 13 and generator 14 can be a labyrinth seal 21. An inflow fan 2 is used to draw air AF_in into the canopy interior 130. The inflow fan 2 can be powerful enough to generate an overpressure in the canopy interior 130. The air AF_in drawn into the canopy 13 in this manner is then compelled or forced to travel along a specific path defined by stator ducts 3 that extend from one end of the stator 12 to the other end, and by an exit duct 4 extending from the stator interior 120 and realized to expel the air to the wind turbine exterior or to re-direct the air back into the canopy interior 130.

A stator duct 3 is mounted so that the entrance opening 30 to the stator duct 3 lies in or in front of a stator back plate 123 and its exit opening 31 lies in or in front of a stator front plate 122. The entrance opening 30 can be outwardly flared or conical to guide an airflow AF_in into the stator duct 3. There can be several such stator ducts 3 arranged in the stator 12.

After leaving the exit openings 31 of the stator ducts 3, the air passes into a front cavity 140_F of the generator 14. The suction created by the outflow fan 1 draws this air through gaps between the winding overhangs and through the air-gap between magnet poles 111 and windings 121, into the stator interior 12, and finally into the exit duct 4. The suction created by the outflow fan 1 also draws air from a generator rear cavity 140_R through gaps between the winding overhangs and through the air-gap between magnet poles 111 and windings 121, into the stator interior 12, and then also into the exit duct 4. The exit duct 4 with a sufficiently large entrance opening in conjunction with a sufficiently powerful outflow fan 1 is enough to efficiently draw an airflow AF_out through the gaps between the windings 121, and also through the air-gap 150 between windings 121 and magnets 111. The exit opening 40 of the exit duct 4 arranged in an upper region of the canopy 13 in order to facilitate the expelling of air from the wind turbine. A mesh or grille (not shown in the diagram) may prevent unwanted debris from falling into the exit duct.

In the exit duct 4, the exit airflow AF_out is sucked through the outflow fan 1 and is then expelled from the wind turbine 10 and/or is returned to the canopy interior 130. To this end, the exit duct 4 has two exit openings, a main exit opening 40 to the wind turbine exterior, and a secondary exit opening 41 to the canopy interior. The amount of air expelled or returned to the interior 130 will depend on the manner in which an exit outflow arrangement 5 is set up. Here, the exit outflow arrangement 5 comprises a first hatch 51 and a second hatch 52. The hatches 51, 52 are actuated by control signals sent from a control unit, whose functionality will be explained with the aid of FIG. 2.

Figure 2:
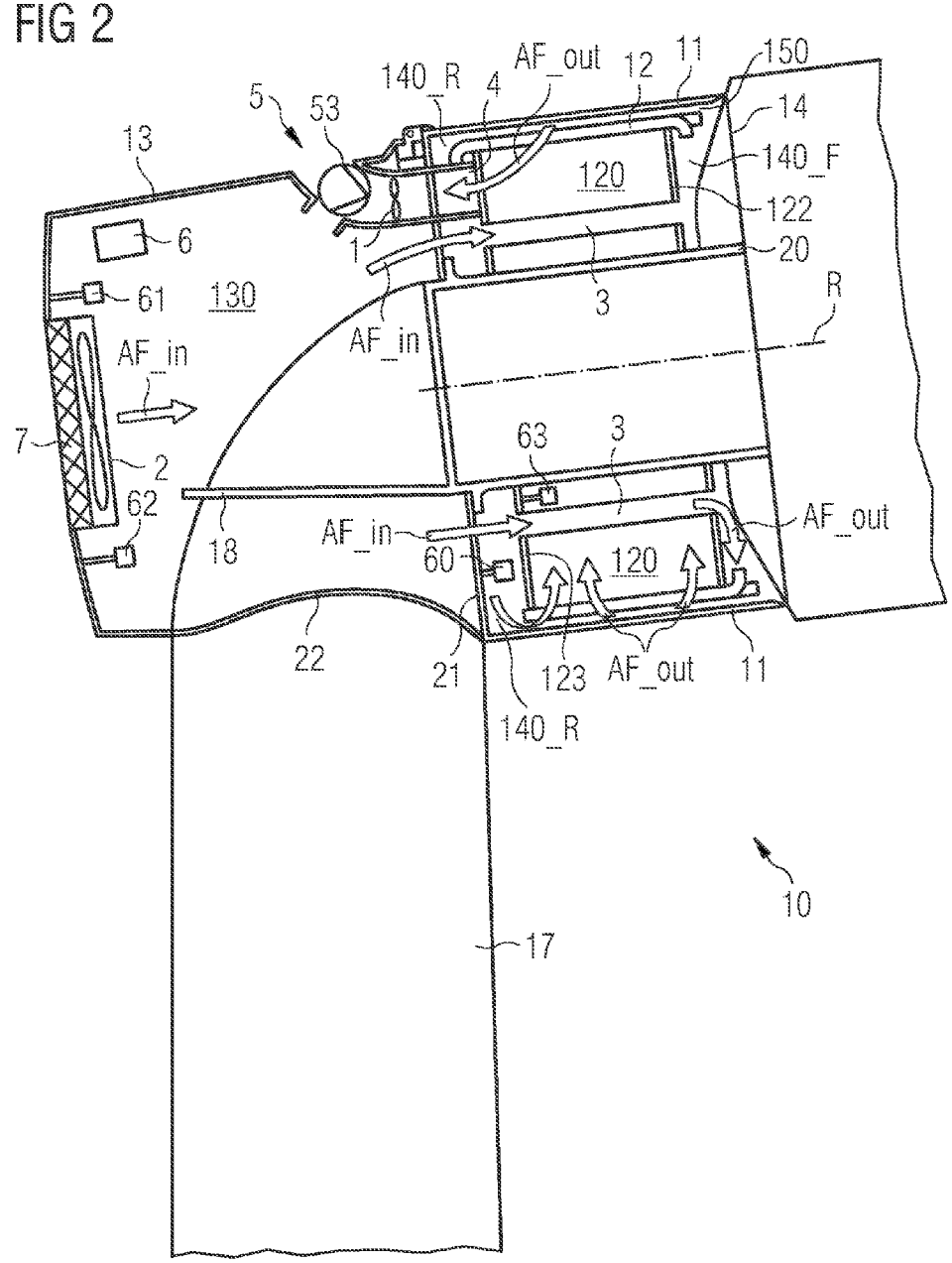
FIG. 2 shows a second embodiment of an airflow control arrangement.

FIG. 2 shows a second embodiment of an airflow control arrangement according to the invention. Here, the exit outflow arrangement 5 comprises a three-way hatch 53 (indicated by an abstract symbol) arranged in the exit duct 4 to open and close the main exit opening 40 and the secondary exit opening 41, so that the airflow inside and out of the wind turbine can be regulated in a particularly efficient manner. The three-way hatch 53 can be controlled so that when the route back into the canopy interior tends to be closed, the route to the canopy exterior tends to be opened.

This embodiment also shows a filter arrangement 73 placed in front of the inflow fan 2, so that the inflow fan 2 draws filtered air AF_in into the canopy interior. The filter arrangement 73 can comprise various filter layers, and may be combined with a mist eliminator (not shown) for reducing the moisture of the air that is drawn into the canopy, thus lowering the risk of damage to components inside the wind turbine.

A control unit 6 determines how to control the three-way hatch on the basis of measurements taken by temperature sensors 60, 61 and humidity sensors 62, 63 arranged at strategic positions. Here, a temperature sensor 60 measures the temperature close to the windings 121; another temperature sensor 61 measures the temperature of the ambient air entering the canopy 13; a humidity sensor 62 measures the humidity of the ambient air entering the canopy 13; and another humidity sensor 63 measures the humidity of the air being drawn into the stator interior 120. The control unit 6 can comprise any number of modules for analysing the information, for collecting additional information from a local or remote processing turbine controller, etc. Measurements from the sensors 60, 61, 62, 63 can be transmitted to the control unit 6 over a wired connection, over a wireless connection, or using any other suitable mode of communication. Similarly, the control unit 6 can transmit control signals to the hatch arrangement over any suitable connection.

Figure 3:
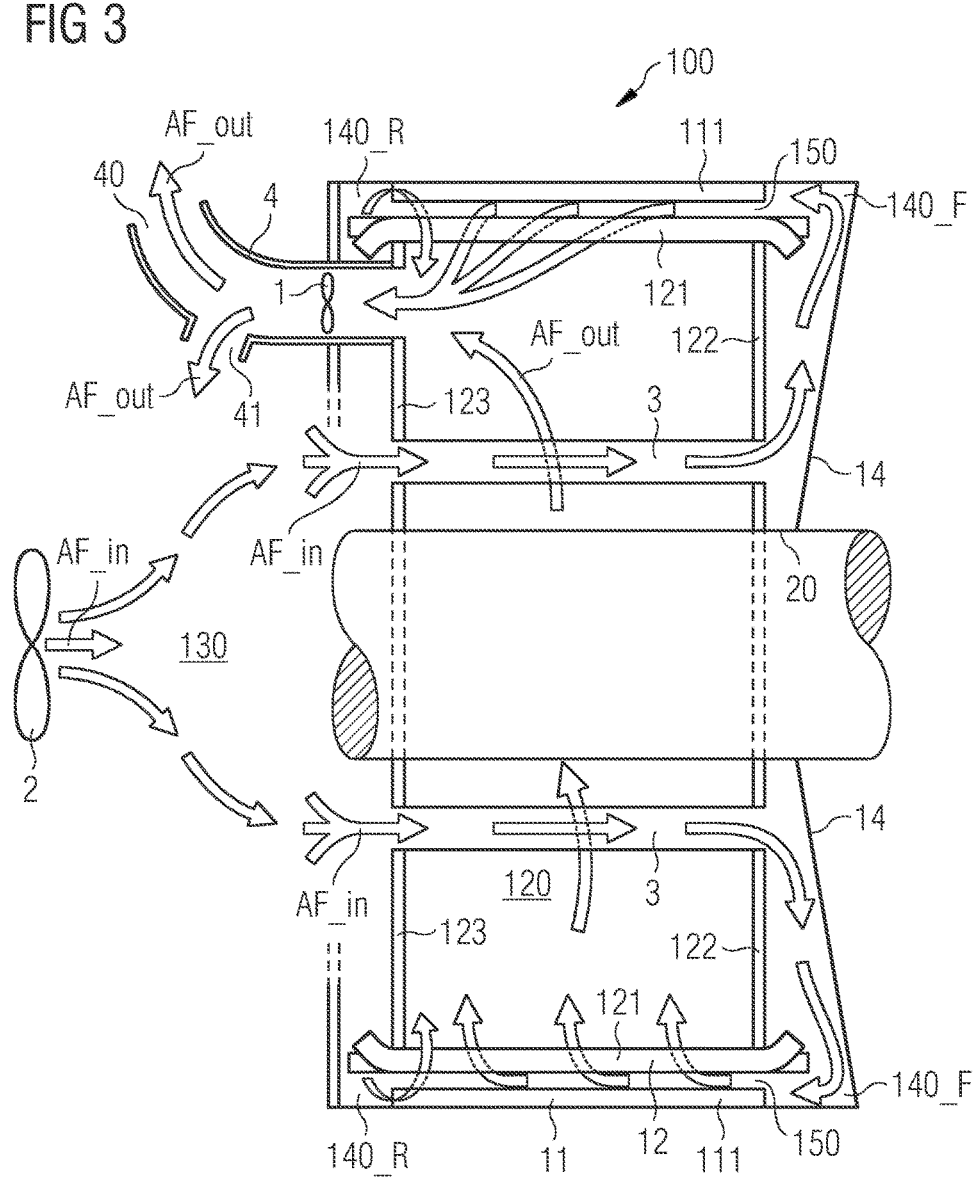
FIG. 3 shows a schematic representation of the airflow path defined by an embodiment of an airflow control arrangement.

FIG. 3 shows a schematic representation of an airflow control arrangement 100 according to the invention, and the path taken by the air AF_in, AF_out as it is directed to flow through regions of the wind turbine. The diagram only shows the relevant components and regions. The inflow fan 2 draws air AF_in into the canopy interior 130. The outflow fan 1 sucks air into the exit duct 4. Various regions 130, 140_R, 140_F, 150, 120 of the wind turbine are linked to give a pre-ordained path along which the air must flow. The canopy interior 130 is physically separated from the stator interior 120 by the stator back plate 123. The air AF_in is therefore forced to pass through the ducts 3 extending from the stator backplate 123 to the stator frontplate 122, where it can flow into the generator front cavity 140_F. From here, the air is sucked by the outflow fan 1 through any gaps between the windings 121 and/or the air-gap 150 between the magnets 111 and the windings 121, so that the air is drawn into the stator interior 120. From here, the air AF_out is sucked into the exit duct.

During operation of the generator, the rotation of the rotor 11 augments the distribution of the airflow AF_out in the air-gap 150 and gaps 160 (cf. FIG. 4) between the windings 121, so that the air can effectively cool the hot windings.

Even when the generator is at still-stand, i.e. both stator 12 and rotor 11 are stationary, the outflow fan 1 can still ensure that the airflow AF_out is effectively drawn through the air-gap 150, so that the temperature of the (initially cooler) magnets 111 can be raised, thus raising the dew-point. As already explained above, a hatch arrangement can be controlled to re-circulate the airflow within the wind turbine, using heat dissipated by the outflow fan 1 to warm the air.

Figure 4:
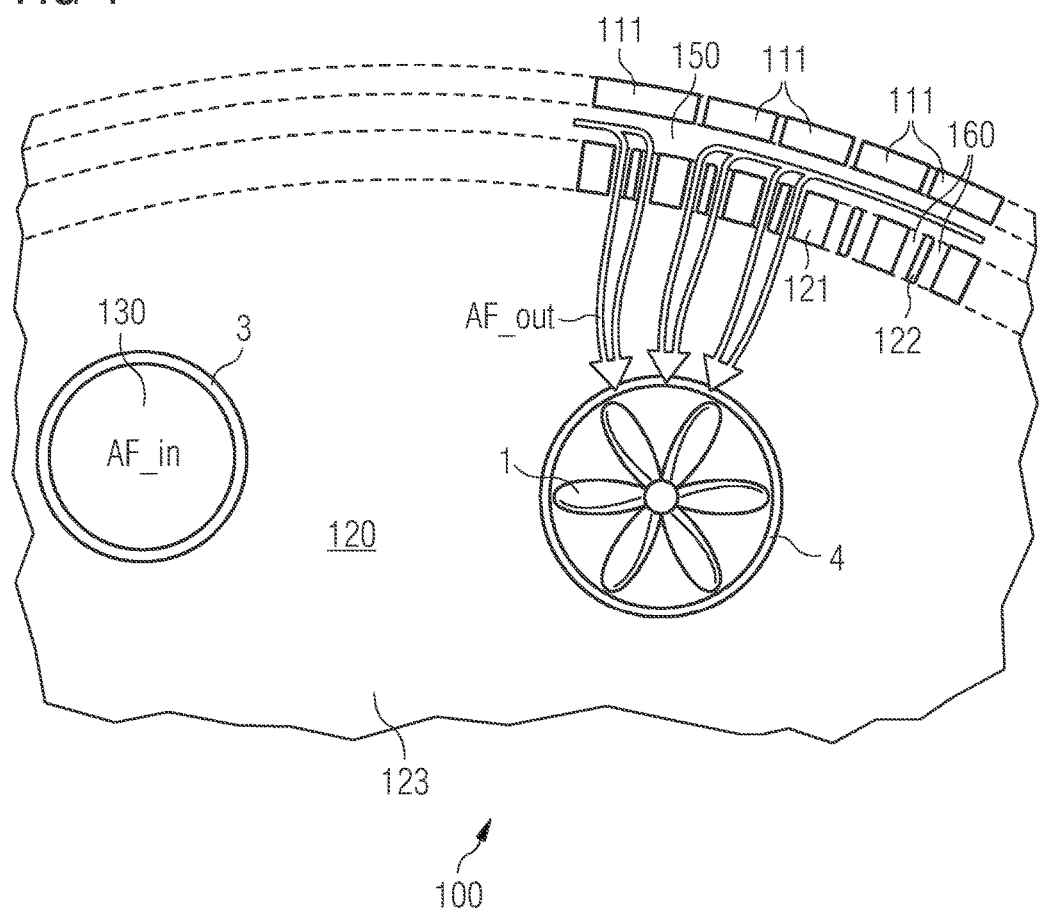
FIG. 4 shows a view from inside the stator towards the stator back plate in an embodiment of airflow control arrangement.

FIG. 4 shows a view from inside the stator 12 towards the stator back plate 123, and various elements of an embodiment of an airflow control arrangement 100 according to the invention. On the left, air AF_in is being sucked or drawn (towards the reader) from the canopy interior 130 through a stator duct 3, which is sealed off from the stator interior cavity 120. The suction force is generated by the outflow fan 1 arranged in the exit duct 4 (away from the reader). Once the air has entered the generator front cavity (not shown here), it is sucked by the outflow fan 1 through the air-gap 150 between magnets 111 and windings 121, and through any gaps 160 between adjacent windings 121. Here, a known winding arrangement is shown, with windings 121 separated by spacers 122. A narrow gap 160 is left between each spacer 122 and winding. The air is forced to pass through this narrow gap 160. The airflow is also sucked in from the canopy interior via a generator rear cavity (behind the stator back plate 123) and then through the air-gap 150 between magnets 111 and windings 121, and through any gaps 160 between adjacent windings 121.

Figure 5:
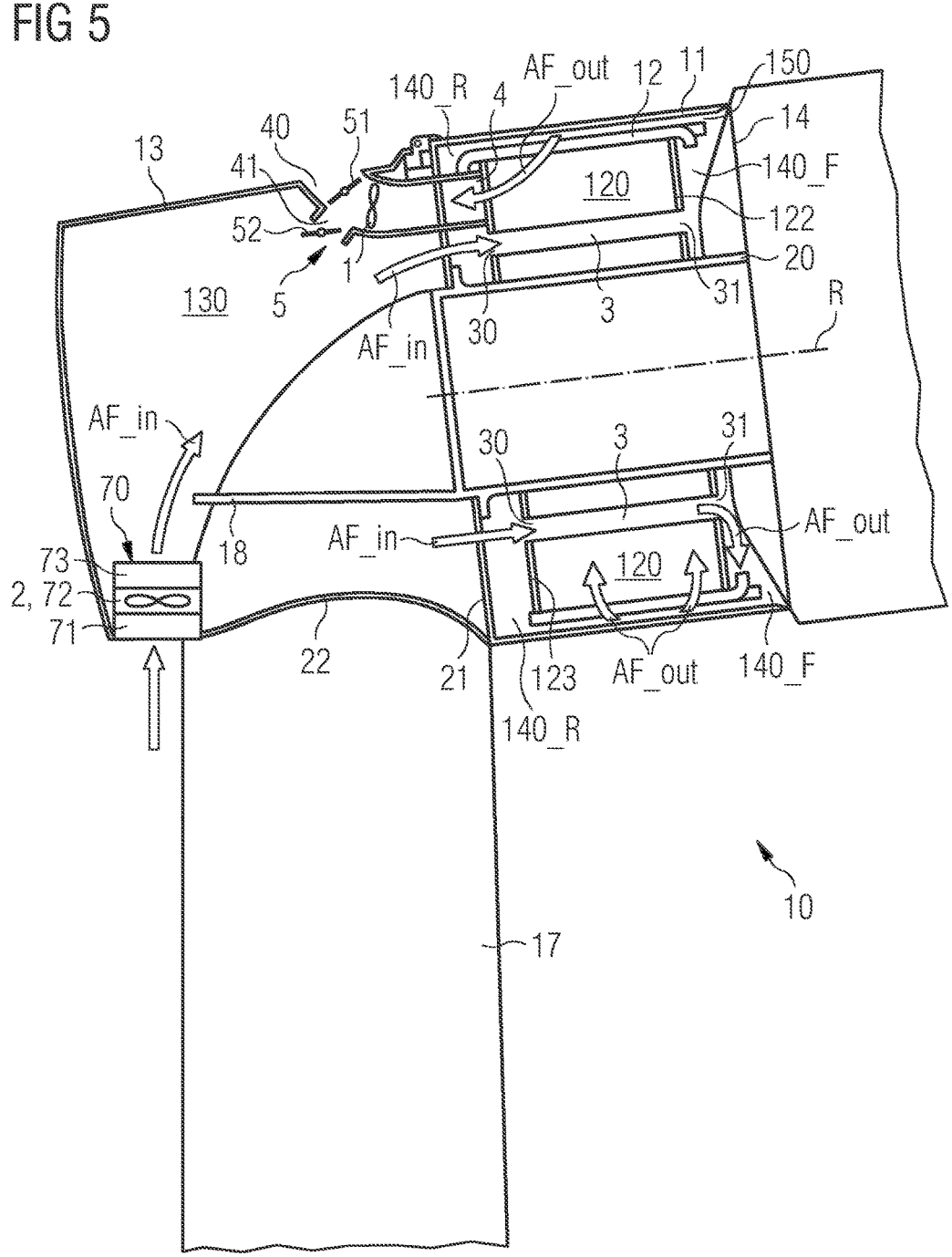
FIG. 5 shows a third embodiment of an airflow control arrangement.

FIG. 5 shows a further embodiment of an airflow control arrangement 100 according to the invention, with the same functional principles as described in the preceding figures for directing an airflow AF_in, AF_out through various regions 3, 140_F, 150, 120, 4 of the generator. Here, a filtration system 70 is arranged in a lower portion of the canopy 13. The filtration system 70 comprises a separator 71 or mist eliminator 71; a number of fans 2, 72 indicated collectively by a common symbol for the sake of simplicity; and a filter arrangement 73.

An inflow fan 2 draws air AF_in from the outside into the canopy interior 130. Here also, the inflow fan 2 can be powerful enough to generate an overpressure in the canopy interior 130. A fan heater 72 can direct warm air at the separator 71 to ensure that ice does not build up inside the separator 71. The filter arrangement 73 can comprise one or more filters for filtering various kinds of particle from the incoming air.

Figure 6:
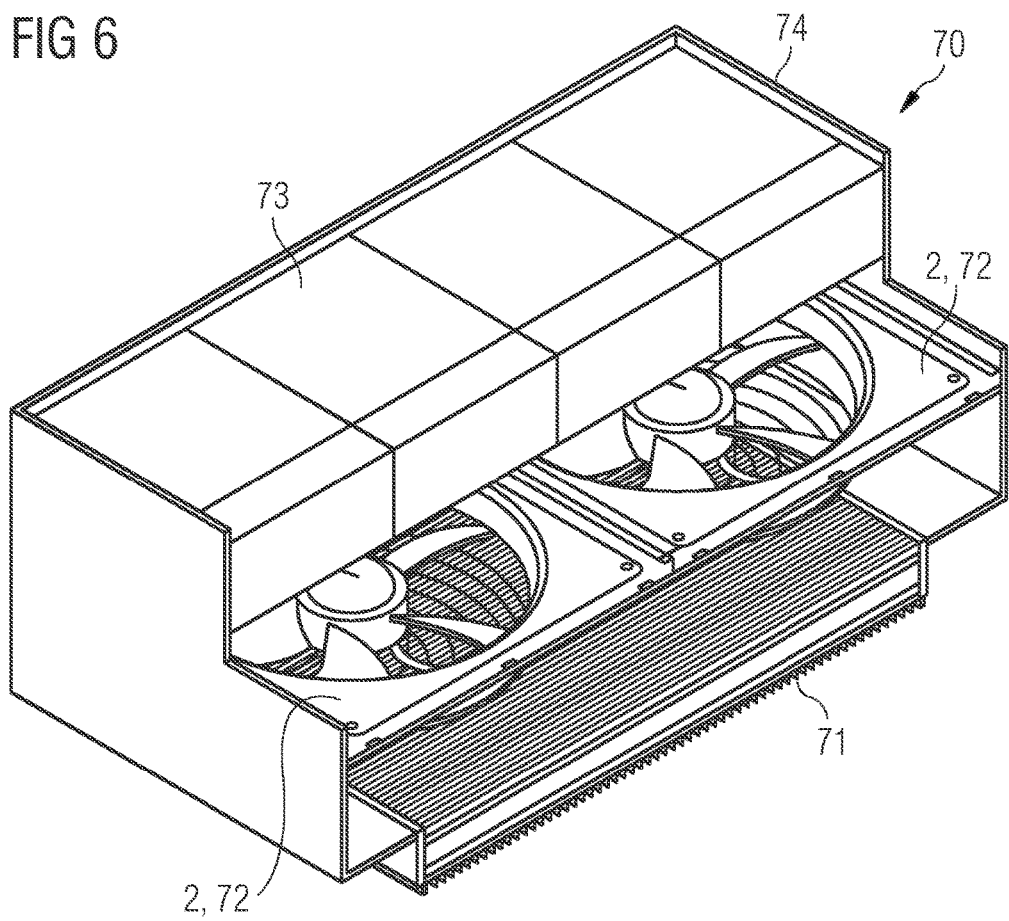
FIG. 6 shows an embodiment of a filtration system for use in an airflow control arrangement.

FIG. 6 shows a filtration system 70 that may be used to filter the air intake in an embodiment of the invention. Here, the filtration system 70 fulfils various functions. It comprises a mist eliminator 71 or separator 71 for removing moisture from the incoming air. The filter arrangement 73 has a number of inlet filters 73 that can be chosen on the basis of their ability to filter sand, dust, pollen, salt, etc. from the incoming air. The filtration system 70 has one or more fans 2, 72, whereby a fan can be an inflow fan 2 to draw or suck air into the canopy interior, and/or a fan heater 72 to direct a warm airflow into or onto the separator 71. The air can be heated by a heating element (not shown). Here, only two fans 2, 72 are shown for the sake of simplicity, but any number of fans 2, 72 might be used. The separator 71 can have an arrangement of angled vanes to deflect the air being drawn in, and to cause any moisture to condense and collect on the angled vanes. The condensed water vapour can be collected and expelled through some appropriate outlet (not shown). To prevent the collected moisture from freezing and clogging the inlet passages of the separator, in this exemplary embodiment of the filtration system 70, one or more fan heaters 72 direct warm air at the separator 71. The warm airflow can melt any ice build-up or prevent ice from forming. The elements 71, 2, 72, 73 of the filtration system 70 are housed in a casing 74 that can be mounted to a supporting part of the canopy e.g. the bedframe, or at some appropriate region of the canopy so that the separator 71 faces outwards, and the inlet filters 73 face inwards into the canopy interior to direct the dried and filtered air into the canopy interior.

FIG. 7 shows a further embodiment of the airflow control arrangement according to the invention. Here, the exit duct 4 is enclosed by thermally insulating material 400 so that heat from the air AF_out passing through the exit duct 40 is not transferred to the canopy interior 130. The thermally insulating material 400 can be applied as one or more layers of cladding wrapped around the exit duct 40 or otherwise secured to the exit duct 40. The diagram does not shown a secondary exit opening in the exit duct 40, but it will be understood that the thermally insulating material 400 could be applied about such a secondary exit opening, so that an airflow can re-circulated in the interior of the wind turbine for a while during a start-up procedure.

Of course, an exit duct made of an insulating material might be used instead so that the material of the exit duct is inherently insulating and prevents significant heat energy transfer into the canopy interior 130.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An airflow control arrangement for a direct-drive wind-turbine, the direct-drive wind-turbine having a generator and an outer rotor free to rotate about an inner stator, the airflow control arrangement comprising:
   an outflow fan arranged to draw an exit airflow through an exit duct, wherein the exit duct extends from an interior cavity of the inner stator to an environment that is exterior to the wind-turbine; and
   an exit flow arrangement that includes a plurality of hatches, the plurality of hatches including a first hatch for regulating the exit airflow to the environment exterior to the wind turbine and a second hatch for regulating the exit airflow into an interior region of a canopy of the direct-drive wind-turbine.

2. The airflow control arrangement according to claim 1, wherein the outflow fan draws the exit airflow into the exit duct from a generator cavity through an air-gap between a plurality of magnet poles of the outer rotor and a plurality of windings of the inner stator.

3. The airflow control arrangement according to claim 1, wherein the exit duct is arranged to extend in an essentially airtight manner through a separating meals arranged to separate the interior cavity from the interior region of the canopy of the wind-turbine.

4. The airflow control arrangement according to claim 1, comprising a plurality of stator ducts, wherein a stator duct of the plurality of stator ducts extends through the inner stator from a rear cavity of the generator proximate a rear of the generator to a front cavity of the generator proximate a front of the generator, and wherein at least a portion of the exit airflow is drawn by the outflow fan through the stator duct.

5. The airflow control arrangement according to claim 1, comprising an inflow fan arranged to draw an input airflow into the interior region of the canopy of the wind-turbine.

6. The airflow control arrangement according to claim 1, wherein the exit outflow arrangement comprises a three-way hatch for regulating the exit airflow to the environment that is exterior to the wind-turbine and/or into the interior of the canopy.

7. The airflow control arrangement according to claim 1, comprising a plurality of temperature sensors for measuring a temperature of the interior region of the canopy and/or in the generator and/or at a plurality of magnet poles of a generator field and/or at a plurality of windings of the generator armature; and a plurality of humidity sensors for measuring humidity of a region exterior to the canopy at the canopy exterior and/or in an interior cavity of the inner stator.

8. The airflow control arrangement according to claim 1, comprising a control unit configured to control at least the exit outflow arrangement and/or the outflow fan and/or an inflow fan on the basis of measurements provided by a sensor.

9. The airflow control arrangement according to claim 1, comprising a filter arrangement and/or a mist eliminator arranged at an inflow fan, wherein the filter arrangement is configured to filter airborne particles from the air, and wherein the mist eliminator is realized to remove humidity from the air.

10. The airflow control arrangement according claim 1, comprising a plurality of stator ducts extending from the interior region of the canopy to a front cavity of the generator proximate a front of the generator.

11. The airflow control arrangement according to claim 1, comprising a thermally insulating layer between the exit duct and the interior region of the canopy.

12. A method of controlling an airflow in a direct-drive wind-turbine with a generator, the direct-drive wind-turbine including an outer rotor free to rotate with an inner stator, the method comprising:
  driving an outflow fan to draw an exit airflow through an exit duct, wherein the exit duct extends from an interior cavity of the stator to an environment that is exterior to the wind-turbine;
  actuating a plurality of hatches of an exit outflow arrangement, the plurality of hatches including a first hatch for regulating the exit airflow to the environment exterior to the wind turbine and a second hatch for regulating the exit airflow into an interior region of a canopy of the direct-drive wind-turbine.

13. The method according to claim 12, comprising the steps of:
  measuring a temperature at a canopy exterior of the canopy and/or in a generator interior region and/or at a plurality of magnet poles of a generator field of the generator and/or at a plurality of windings of a generator armature of the generator;
  measuring a relative humidity at the canopy exterior and/or in the generator front cavity and/or in the interior of the canopy interior and/or in the interior or cavity of the stator; and
  controlling the exit outflow arrangement on the basis of the measurements using control signals.

14. The method according to claim 13, comprising the steps of:
  actuating the exit outflow arrangement to guide essentially the entire exit airflow back into the interior region of the canopy; and
  driving the outflow fan to heat and/or re-circulate the exit airflow until a a desired temperature is reached in a specific region of the wind-turbine.

\* \* \* \* \*

UNITED STATES PATENT AND TRADEMARK OFFICE
CERTIFICATE OF CORRECTION

PATENT NO. : 9,624,908 B2
APPLICATION NO. : 14/253893
DATED : April 18, 2017
INVENTOR(S) : Giovanni Airoldi et al.

Page 1 of 1

It is certified that error appears in the above-identified patent and that said Letters Patent is hereby corrected as shown below:

On the Title Page

Item [30], Line 1, change "DE" to -- EP --

Item [57], Line 6, change "wind turbine." to -- wind-turbine. --

Item [57], Line 7, change "wind turbine" to -- wind-turbine --

In the Claims

Column 14, Line 47, Claim 1, Line 12, change "wind turbine" to -- wind-turbine --

Column 14, Line 57, Claim 3, Line 3, change "meals" to -- means --

Column 16, Line 12, Claim 12, Line 12, change "wind turbine" to -- wind-turbine --

Column 16, Line 33, Claim 14, Line 7, change "a a" to -- a --

Signed and Sealed this
Fifth Day of December, 2017

Joseph Matal
*Performing the Functions and Duties of the
Under Secretary of Commerce for Intellectual Property and
Director of the United States Patent and Trademark Office*